(12) United States Patent
Klein

(10) Patent No.: US 7,234,133 B2
(45) Date of Patent: Jun. 19, 2007

(54) SOFTWARE EXPIRY BEFORE DELIVERY

(75) Inventor: Udo Klein, Maximiliansau (DE)

(73) Assignee: SAP Aktiengesellschaft, Walldorf (DE)

( * ) Notice: Subject to any disclaimer, the term of this patent is extended or adjusted under 35 U.S.C. 154(b) by 739 days.

(21) Appl. No.: 10/441,251

(22) Filed: May 20, 2003

(65) Prior Publication Data

US 2004/0237063 A1 Nov. 25, 2004

(51) Int. Cl.
*G06F 9/44* (2006.01)
*G06F 11/00* (2006.01)

(52) U.S. Cl. .......................... 717/130; 714/35

(58) Field of Classification Search ........ 717/120–122, 717/124, 125; 714/35
See application file for complete search history.

(56) References Cited

U.S. PATENT DOCUMENTS

| | | | |
|---|---|---|---|
| 5,564,038 A | 10/1996 | Grantz et al. | |
| 5,815,714 A | 9/1998 | Shridhar et al. | |
| 5,970,252 A | 10/1999 | Buxton et al. | |
| 6,044,469 A | 3/2000 | Horstmann | |
| 6,237,140 B1 | 5/2001 | Carter et al. | |
| 6,247,175 B1 | 6/2001 | Ledford et al. | |
| 6,748,582 B1 * | 6/2004 | Chiles et al. | 717/111 |

2002/0107750 A1 8/2002 Kanevsky et al.

FOREIGN PATENT DOCUMENTS

EP 1 072 979 A2 1/2001

OTHER PUBLICATIONS

"mkgeturl.c," [online], 1998, [retrieved on Sep. 8, 2006], Mozilla. org, Retrieved from Internet <URL: http://lxr.mozilla.org/classic/source/network/main/mkgeturl.c>, (88 pages).*
'Mozilla Cross-Reference' [online]. Mozilla.org, Oct. 26, 1998, [retrieved on Dec. 13, 2004], Retrieved from the Internet: <URL: http://lxr.mozilla.org/classic/source/network/main/mkgeturl.c>.

* cited by examiner

*Primary Examiner*—Tuan Dam
*Assistant Examiner*—Eric B. Kiss
(74) *Attorney, Agent, or Firm*—Fish & Richardson P.C.

(57) ABSTRACT

Techniques are described for preventing customers from receiving faulty code. The techniques involve adding marker code to potentially problematic code portions that are not to be included in a final version of the code. The marker code may include a reference date, such as a first date of testing of the code. Before the reference date, various scanning and/or searching tools may be used to determine a presence of the marker code within the code. Moreover, after this reference date, during running of the code, the marker code may cause immediate and program-wide cessation of the code, and provide a message as to why the cessation has occurred. In this way, the problematic code portion(s) will not be passed to a large number of customers.

13 Claims, 4 Drawing Sheets

US 7,234,133 B2

SOFTWARE EXPIRY BEFORE DELIVERY

TECHNICAL FIELD

This description relates to ensuring code quality.

BACKGROUND

During code development, a code developer may include various code portions that the developer does not intend to be included in a final version of the code, as it is to be shipped to a customer. Such code portions may be included for a number of reasons. For example, the code portions may represent ideas of the developer which may or may not function as intended, and which may therefore have to be removed if they do not ultimately function in the intended manner. As another example, the code portions may be included merely to test a functionality of other code portions.

As yet another example, it may be the case that the code in question is designed to use data from a particular database, where that database may be non-existent or inaccessible (at the time of development), or may simply be too large and unwieldy to use during development. In such cases, the developer may create fictional data to use, with the intention of using the real data at a later date. One such situation may arise, for example, when the code is designed to search a customer database. Since the actual customer database may be very large, the developer may create fictional customer data for use during development of the code.

Similarly, when a mathematical algorithm is to be used within the code, the developer may avoid use of the algorithm simply by using a made-up output value during calculations. This may be done, for example, to avoid lengthy processing times, or in cases where the algorithm itself is still being developed.

Various techniques exist for avoiding the circumstance of erroneously shipping the code with the undesired code portions still present. For example, developers may use various reminders to themselves to remove or modify the code before delivery (e.g., may insert comments within the code containing a reminder to remove a particular code portion). The developers also may try to design the code portions such that their implementation is user-dependent (e.g., the code portions will operate only for the developers). Moreover, various testing procedures, with testers operating independently of the developers, may be implemented prior to shipping of the code.

However, although procedures exist for removing undesired code portions from a product, prior to shipping of the product to a customer, such conventional procedures often may be imperfect or unreliable. For example, developers may forget to check for and remove/modify the undesired code portions, or may overlook the code portions during a final review of the code. Moreover, testers may be even more susceptible to overlooking the undesired code portions, since they may be less familiar with the code than the developer.

As a result, a product may be shipped to a customer with the undesired code portions intact, resulting in faulty operation of the product. Often, particularly in situations where the code has passed through testing and other quality control measures, such faulty operation may not be immediately or easily noticed. For example, in the case where fictional data is used within the undesired code portion, the code may appear to run in an acceptable manner. In such cases, faulty operation of the code may not be noticed until after the code has been in use for some time, during which time it may have been outputting erroneous data.

SUMMARY

According to one general aspect, marker code is inserted within a code portion of a code section, and the marker code includes a reference date, wherein the code portion is not to be included within a final version of the code section. A first command is inserted within the marker code to compare the reference date to a current date when running the code portion, to thereby output a comparison result, a second command is inserted within the marker code to disable operation of the code section when the comparison result indicates that the current date is on or after the reference date.

Implementations may include one or more of the following features. For example, the code section may be run, it may be determined from the comparison result that the current date is on or after the reference date, and operation of the code section may be disabled.

In inserting the reference date, the reference date may be included as a test date designated for testing the code section. Also, scan code may be included within the marker code, where the scan code designed to be detected by a scanning tool. In this case, the scan code may include illegal code statements for a programming language of the code section, and the scanning tool may be designed to detect illegal code statements.

In inserting the reference date, searchable code may be included within the marker code, where the searchable code is designed to be detected by a searching tool. In inserting the second command, a message to be displayed in conjunction with disabling operation of the code section may be included.

According to another general aspect, an apparatus includes a storage medium having instructions stored thereon. The instructions include a first code segment that is temporarily contained within a larger code segment and is not to be included in a later version of the larger code segment, a second code segment for comparing a current date to a reference date and outputting a comparison result, where the second code segment is included within the first code segment, and a third code segment for halting an operation of the larger code segment, based upon a determination from the comparison result that the current date is on or after the reference date.

Implementations may include one or more of the following features. For example, the third segment may be contained within the second code segment. The first code segment may be included within the larger code segment during a development of the larger code segment, and the reference date may represent a testing date associated with a testing of the larger code segment for delivery of the larger code segment to a user.

The second code segment may include a fourth code segment for displaying, in conjunction with the halting of the operation of the larger code segment, a message regarding a presence of the first code segment.

A fourth code segment may be included for examining the larger code segment to thereby detect the first code segment. In this case, the fourth code segment may be for scanning the larger code segment to identify a pre-determined character within the first code segment. Further, the pre-determined character may include an illegal programming statement. The fourth code segment may be further for searching the larger code segment for a character that is within the first code segment and that has been catalogued for searching.

According to another general aspect, a system includes means for designating a code portion for removal from code prior to a beginning of a pre-determined stage of completion of the code, means for determining whether the beginning of the pre-determined stage has occurred, and means for disabling the code upon a determination that the beginning of the pre-determined stage has passed without the removal of the code portion from the code.

Implementations may include one or more of the following features. For example, the means for designating the code portion may include marker code, and the means for disabling the code may include a command within the marker code to terminate the code.

The means for disabling the code may include means for outputting a message regarding inclusion of the code portion within the code, in conjunction with the disabling of the code. Also, means for scanning the code for a plurality of instances of the code portion may be included in the system, as well as, or alternatively to, means for searching the code for a specific instance of the code portion.

The details of one or more implementations are set forth in the accompanying drawings and the description below. Other features will be apparent from the description and drawings, and from the claims.

DETAILED DESCRIPTION

Figure 1:
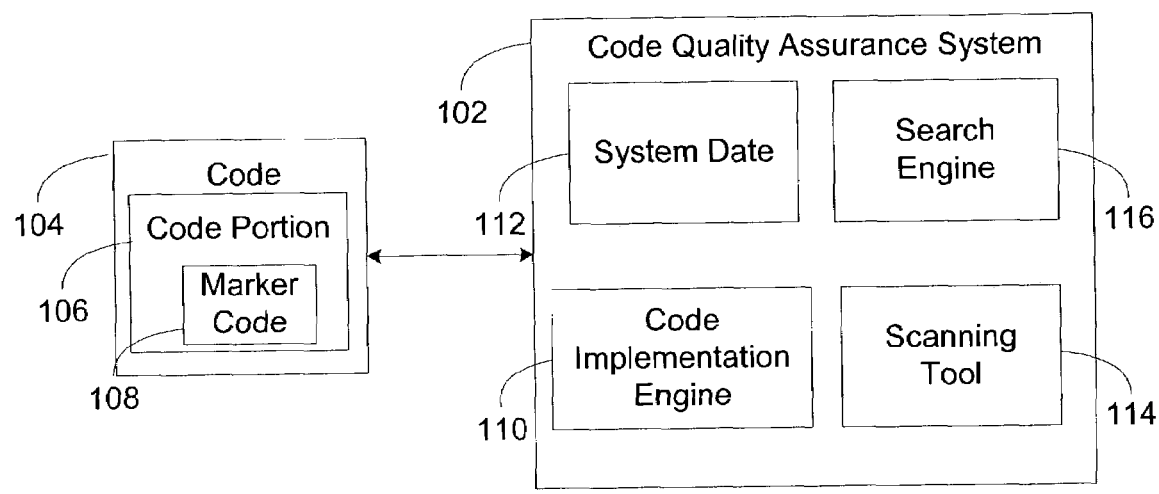
FIG. 1 is a block diagram of a code quality assurance system.

FIG. 1 is a block diagram of a code quality assurance system 102. In FIG. 1, code 104 includes a code portion 106 that is not to be included within a final version of the code 104. The code portion 106 includes marker code 108, which includes code that is designed to interact with the code quality assurance system 102 to ensure that the code portion 106 is not included within the final version of the code 104.

Specifically, the marker code 108 includes a reference date and a command to disable the code 104 (e.g., terminate execution of the code 104) on or after the reference date. The reference date may be, for example, a first day of testing of the code 104.

A code implementation engine 110 is operable to run the code 104, including the code portion 106 and the marker code 108. During running of the code 104, and in response to the marker code 108, the code implementation engine 110 compares the reference date within the marker code 104 to a current system date 112 that is within (or available to) the code quality assurance system 102. If the system date 112 is on or after the reference date, the code implementation engine 110 implements the remainder of the marker code, by, for example, completely stopping the implementation of the code 104, and outputting a message regarding the presence of the marker code 108 (and thereby its related code portion 106).

The code quality assurance system 102 further includes a scanning tool 114, which is capable of scanning the code 104 for, for example, the marker code 108. By using the scanning tool 114, the code developer and/or a code tester may detect the marker code 108 and make a decision regarding the corresponding code portion 106, perhaps before the reference date, without having to encounter the termination that may be caused by an actual running of the marker code 108 on or after the reference date.

The code quality assurance system 102 further includes a search engine 116, which is operable to search for and find the marker code. Somewhat similarly to the operation of the scanning tool 114, the search engine 116 allows a user to locate the marker code 108 and associated code portion 106, before the reference date and/or without having to encounter a system halt. More particularly, whereas the scanning tool 114 is operable to scan all of the code 104 for any marker code that may be present therein, the search engine 116 is operable to search for the particular marker code 108, for which the developer or tester may be specifically looking.

It should be understood that the code quality assurance system 102 and its various components may be implemented in hardware or in software, where such software may include the marker code 108 itself. Moreover, components of the code quality assurance system 102 may be integrated in one system or location, or may be implemented separately, in disparate systems. Further, a component of the code quality assurance system 102 may represent more than one such component; for example, the code implementation engine 110 may represent engines that may be separately used by each of a developer or a tester. Examples of the structure and operation of the code quality assurance system 102 are given in more detail below.

Figure 2:
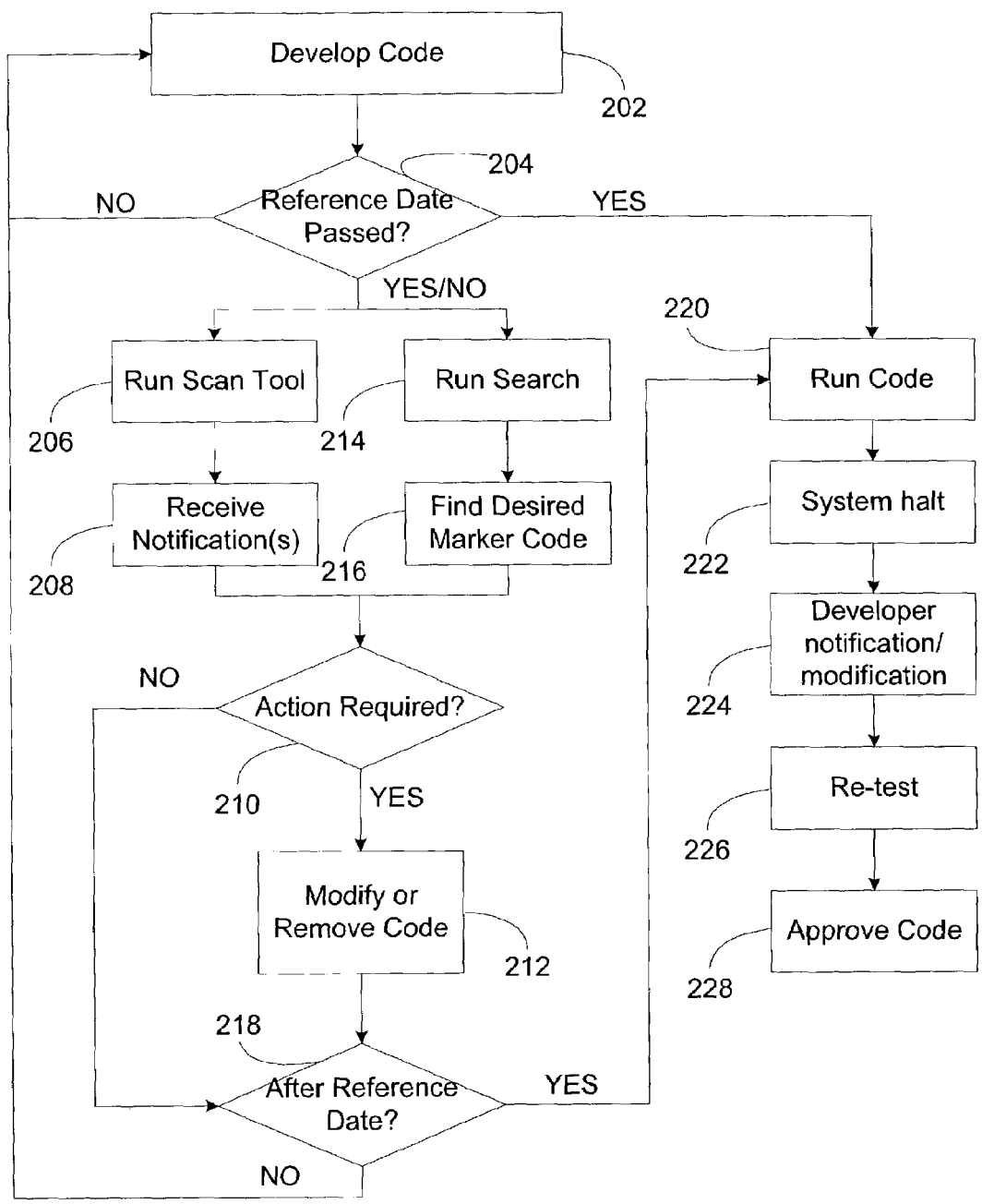
FIG. 2 is a flowchart illustrating example operations of the code quality assurance system of FIG. 1.

FIG. 2 is a flowchart 200 illustrating example operations of the code quality assurance system 102 of FIG. 1. In FIG. 2, a code developer develops the code 104 (202). In various situations such as those described above, the developer includes the marker code 108 within the code portion(s) 106, where the code portion(s) 106 may have to be modified or removed before final testing of the code being developed. The marker code 108 includes a reference date, where the reference date may be the date of (a beginning of) final testing of the code 104.

As development proceeds, it is determined whether the reference date has passed (204). If not, code development may proceed (202). Whether the reference date has passed or not, the developer may run the scanning tool 114 of FIG. 1 (206). Of course, it should be understood from the above description of FIG. 1 that a supervisor, code tester, or some other involved party also may run the scanning tool 114. It is assumed for the sake of example, however, that the developer is the party responsible for determining and/or implementing modifications to the code 104, and so the developer is primarily discussed in many of the examples below.

As explained above, the scanning tool 114 operates to detect instances of marker code, and thereby identify the code portions marked by instances of the marker code 108. In this way, the developer may receive notification(s) regarding the marker code instances from the scanning tool 114 (208). Based on the notification(s), the developer may determine whether action is required with respect to the corresponding marker code 108 and/or its associated code portion 106 (210), and, if necessary, may modify or remove the code portion 106 accordingly (212).

Similarly, as another option when the reference date may or may not have passed (204), the developer (or other involved party) may run a search for a particular instance of marker code (214), using the search engine 116 of FIG. 1. In this way, the developer may find a particular, desired instance of marker code (216), e.g., the marker code 108. As with the results of the scanning tool 114, the developer may determine, based on the results of the search engine 116, whether action is required with respect to the corresponding marker code and/or its associated code portion (210). If so, the developer may modify the marker code and/or its associated code portion accordingly (212).

After using the scanning tool 114 and/or the search engine 116, the developer also may determine that no action is required (210). Then, if the reference date has not passed (218), code development may continue (202). For example, results from the scanning tool 114 and/or the search engine 116 may alert the developer that marker code 108 exists within the code portion 106, where the code portion 106 represents a fictional customer database. If a corresponding actual customer database is not yet available, then the developer may simply continue to use the fictional database.

Of course (as referred to above), if the customer database has become available, or action is otherwise required, then the developer may modify the marker code 108 and/or its associated code portion 106 accordingly (212). Thus, in the example just discussed, the developer may learn at a particular time that an actual customer database has now become available, and may desire to begin using this database in conjunction with the code being developed (rather than the fictional database). By running a search for the relevant marker code 108, the developer may identify the appropriate code portion 106 associated with the fictional database, and replace it accordingly.

In the examples discussed above, the reference date may or may not have passed (204). As already mentioned, the person utilizing the scanning tool 114 and/or the search engine 116 may be any one of the developer, a code tester, or some other party. In any case, as long as the reference date has not passed, code development may continue (202).

On the other hand, once the reference date has passed (204, 218), then code development is typically over, and testing of the code, by one or more code testers, begins. At this point, theoretically, the developer will have remembered to find and remove all marker code instances, and to remove or modify all corresponding code portions. If this is in fact the case, then the tester may find that the code is fully operational and functional, and may approve the code for shipment to customers. However, such a case is not illustrative of the advantageous features of the techniques discussed herein, and so is not discussed in further detail.

As another example, it is assumed that as of the reference date, the developer has mistakenly forgotten (or otherwise erroneously left in) at least one undesired code portion 106 containing the marker code 108. In this case, the tester(s) (or some other party, including the developer), may run the code 104 for testing purposes (220). In this case, as described above with respect to FIG. 1, the presence of the marker code 108 within the undesired code portion 106 will cause all of the code 104 to cease functioning, thereby causing a system halt (222).

Unlike messages or comments regarding an undesired code portion, which may be ignored or otherwise overlooked, such a termination of the code 104 will not typically be overlooked by the tester. Rather, the tester will notify the developer of the obvious system fault, so that the developer may modify the code portion 106 (and marker code 108) accordingly (224). Afterwards, the tester may re-test the code 104 (226), and then approve the code for shipment to the customer (228).

Even in an example in which the tester 140 passes the code 104 with the marker code 108 intact (for example, the tester may simply fail to test the code 104 at all), a customer (or other party first using the code 104) would experience the system termination, and would report the problem accordingly. Given that newly-developed code is often initially shipped only to a small batch of customers, the problem would be discovered quickly, before being passed to a large number of customers.

Figure 3:
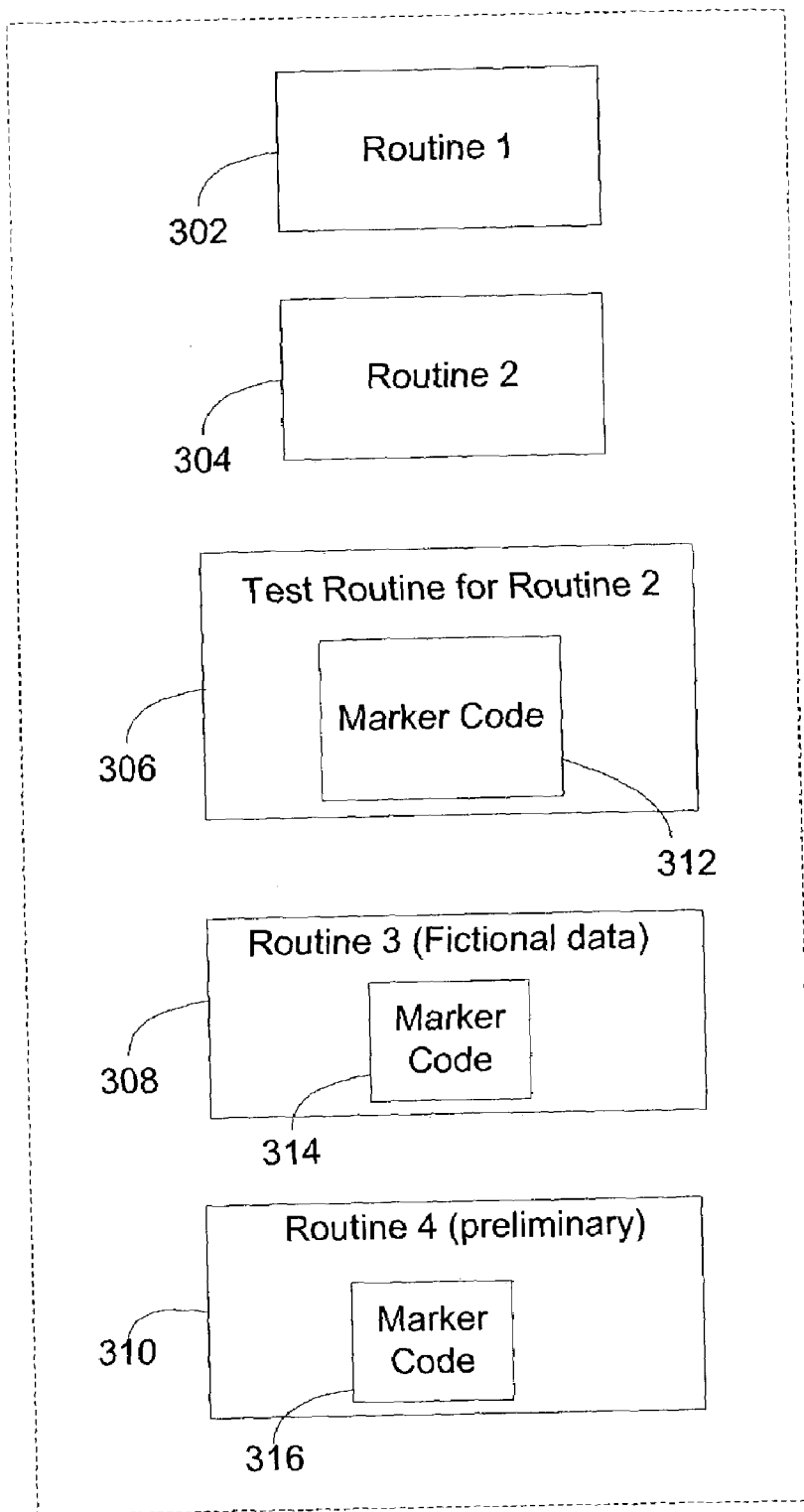
FIG. 3 is a block diagram of code portions making up a code section.

FIG. 3 is a block diagram of code portions making up code 300. The code 300 represents a specific example of code being developed, such as the code 104. The code 300 includes a first routine 302 and a second routine 304, which represent code portions that are definitely intended to be included in a final version of the code 300.

A test routine 306 is designed to test an operation of the second routine 304 during development, while a third routine 308 includes fictional data that might be used during development by, for example, one or both of the routines 302 and 304. A fourth routine 310 represents a preliminary routine that may or may not be included in a final version of the code 300.

The test routine 306 includes marker code 312, while the third routine 308 includes marker code 314, and the fourth routine includes marker code 316. As explained above, such marker code is designed to ensure that the code portions 306, 308, and 310 are not included (at least in their present form) in the final version of the code 300.

The code 300 may be written in any number of programming languages. For the purposes of example, the Advanced Business Application Programming (ABAP) language is discussed herein. However, the implementations described herein can be used with virtually any other programming language.

In ABAP, an example of the marker code 312, 314, or 316 might be written as shown in Code Section 1:

---
Code Section 1

```
IF sy-datum > '20030601';
    Message x016(rp) WITH 'TODO: remove test code'.
ENDIF
```
---

In Code Section 1, it is assumed that the reference date for the marker code is a date on which testing of the code 300 is to begin. Specifically, in Code Section 1, the reference date is Jun. 1, 2003. The Code Section 1 includes, in its second line, an "x-message" for halting operation of the code 300 and for simultaneously outputting the message "remove test code" (e.g., the test routine 306, the third routine 308, or the fourth routine 310).

Figure 4:
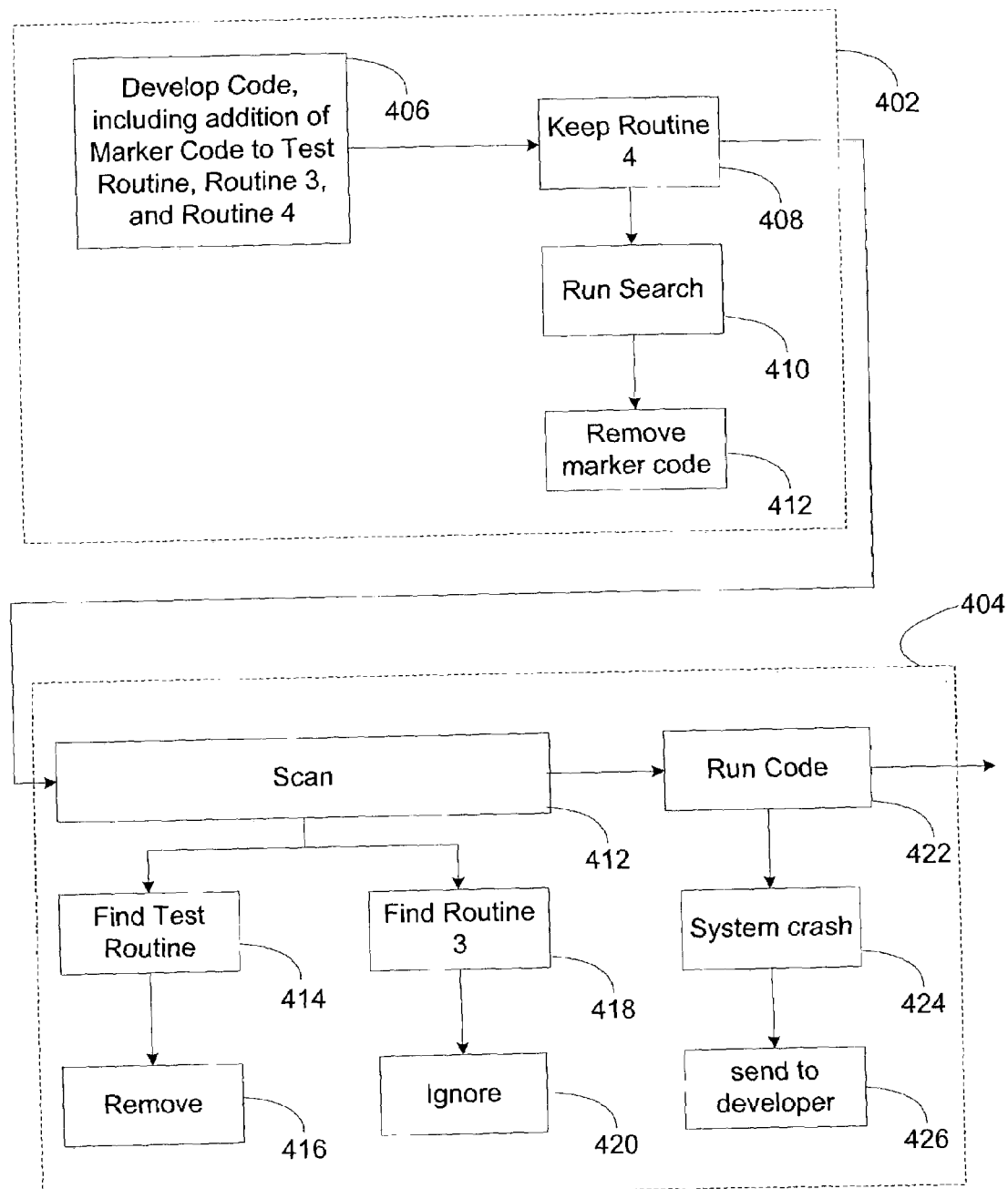
FIG. 4 is a timeline for code production of the code of FIG. 3.

FIG. 4 is a timeline for code production of the code 300 of FIG. 3. In FIG. 4, a development phase (402) is followed by a testing phase (404), where a start of the testing phase is determined by a pre-determined test (reference) date. In the development phase (402), the code 300, as shown in FIG. 3, is developed (406). After (or during) development, the developer may decide that the fourth routine 310 should be kept within the final version of the code 300 (408). Therefore, the developer may run a search for the fourth routine 310 (410), as referred to in the flowchart 200 of FIG. 2, and may thereafter remove the marker code 316 from the fourth routine 310 (412).

One technique for enabling a search for specific marker code, i.e., for implementing the search engine 116 of FIG. 1, is to utilize a full-text search engine. In this way, the developer (in this case) may simply search for a specific word or phrase within the marker code 316. However, particularly when the code 300 is lengthy, this technique may require excessive amounts of time to implement.

Another search technique, and one that may be implemented in ABAP and other programming languages, is the use of a "where-used" list, where the same or similar techniques also are known as a "cross-reference" list. Such techniques may, for example, track specific code features/commands (e.g. a special "message" command may be included in Code Section 1, specifically for implementing a "where-used" list). As a result, such techniques may be significantly faster than performing a full text search.

In general, then, any type of method for identifying (a portion of) the marker code for future searching may be used to quickly search the marker code instances for a particular instance. Although such a method may include encapsulation (i.e., incorporation into re-usable functions/sub-routines) of the relevant, searchable code, such encapsulation may be avoided in some implementations, so that future users (who may be unfamiliar with the reason for inclusion of the code) will not "correct" or otherwise modify the encapsulated code, and thereby disable the search functionality.

After the code development phase (402), it is assumed that the developer forgets to remove the test routine 306 and the third routine 308. This may occur even if the developer makes use of the scanning tool 114, as discussed above with respect to FIG. 2, since the developer may simply ignore or neglect notifications that are output by the scanning tool 114. Thus, the developer may forward the code 300 to the testing phase (404) with the code portions 306 and 308 intact.

During testing, a tester may scan the code 300 using the scanning tool 114 (412). As discussed above, the scanning tool 114 may be used to scan all of the code 300 to find any of the three instances of marker code 312, 314, and 316 that are still remaining within the code 300. It should be understood that various examples of scanning tools, as well as other automatic test tools, exist in different settings. For example, some scanning tools are used to check a consistency of naming conventions used within a code section, and other scanning tools are used to check for potential security (e.g., hacking) susceptibilities of the code.

Another type of scanning tool is one that scans code for illegal code statements. Examples of illegal code statements may include code statements that violate a general programming rule (e.g., unreachable code like code after an "exit" statement in ABAP).

Therefore, in one example, the scanning tool 114 may be used simply by including such illegal statements within the marker code. For example, in ABAP, a statement such as "BREAK-POINT" or "EXIT. EXIT." may be used, which are illegal in the ABAP language but will be picked up by standard scanning tools. As a result, the marker code 312, 314, and 316 might be implemented as shown in Code Section 2:

---
Code Section 2
---
IF sy-datum > '20030601';
    Message x016(rp) WITH 'TODO: remove test code'.
    EXIT. EXIT.
ENDIF
---

Thus, by including the line "EXIT. EXIT." within the marker code, the developer ensures that the marker code may be detected by the scanning tool 114. In some implementations, again, steps may be taken to help ensure that persons unfamiliar with the purpose of Code Section 2 do not "fix" the code by removing the illegal statement(s). For example, comments may be included explaining the purpose of the code section.

During scanning, then, the tester may discover the test routine 306 (414), and, perhaps after consulting with the developer, may remove the test routine 306 from the code 300 (416). Also during scanning, the tester (or perhaps a separate tester) may be alerted to the presence of the third routine 308 (418). In FIG. 4, it is assumed that the tester ignores (or never sees) messages regarding the third routine 308 (420). This may occur due to inattentiveness of the tester, or in situations where the tester neglects to run the scanning tool 114, or in situations where the tester simply thought that the scanning tool 114 had merely identified a correctable, syntactical error (particularly plausible since the third routine 308 includes fictional data that may seem to allow the code 300 to operate in its intended fashion).

After scanning, the tester(s) proceed to run the code 300 for actual testing thereof (422). At this point, the marker code 314 recognizes that the current date is past the reference (testing) date, and causes a halt of the system (424). The tester recognizes that a serious problem is still present, and forwards the code 300 back to the developer for correction (426). Once the correction is made (in this case, the third routine 308 is removed and the appropriate, real data is substituted), and assuming no other errors are encountered, then the code 300 is ready for shipment. As already mentioned, even if the tester(s) somehow miss the presence of the marker code 314 (e.g., by failing to run the code 300 at all), the first customer (or other party) to run the code will notice the defective nature of the code 300, and report the code 300 for correction. In this way, erroneous versions of the code 300 may not be spread to a large number of customers.

As described above, the problem of providing customers with faulty code may be avoided by adding marker code to potentially problematic code portions that are not to be included in a final version of the code. The marker code may include a reference date, such as a first date of testing of the code. Before the reference date, various scanning and/or searching tools may be used to determine a presence of the marker code within the code. Moreover, after this reference date, during running of the code, the marker code may cause immediate and program-wide cessation of the code, and provide a message as to why the cessation has occurred. In this way, the problematic code portion(s) will not be passed to a large number of customers.

A number of implementations have been described. Nevertheless, it will be understood that various modifications may be made. Accordingly, other implementations are within the scope of the following claims.

What is claimed is:

1. A method comprising:
    inserting marker code within a code portion of a code section, the marker code including a reference date, wherein the code portion is not to be included within a final version of the code section, wherein inserting the marker code comprises including scan code comprising an illegal code statement for a programming language within the marker code, the scan code designed to be detected by a scanning tool;

inserting a first command within the marker code to compare the reference date to a current date when running the code portion, to thereby output a comparison result;

inserting a second command within the marker code to disable operation of the code section when the comparison result indicates that the current date is on or after the reference date;

running the code section;

determining from the comparison result that the current date is on or after the reference date; and disabling operation of the code section.

2. The method of claim 1 wherein inserting the reference date comprises including the reference date as a test date designated for testing the code section.

3. The method of claim 1 wherein inserting the reference date comprises including searchable code within the marker code, the searchable code designed to be detected by a searching tool.

4. The method of claim 1 wherein inserting the second command comprises including a message to be displayed in conjunction with disabling operation of the code section.

5. An apparatus comprising a storage medium having instructions stored thereon, the instructions including:

a first code segment that is temporarily contained within a larger code segment and is not to be included in a later version of the larger code segment;

a second code segment that when executed compares a current date to a reference date and outputs a comparison result, where the second code segment is included within the first code segment;

a third code segment that when executed halts an operation of the larger code segment, based upon a determination from the comparison result that the current date is on or after the reference date; and a fourth code segment that when executed scans the larger code segment to identify a pre-determined marker code including an illegal programming statement to thereby detect the first code segment.

6. The apparatus of claim 5 wherein the third segment is contained within the second code segment.

7. The apparatus of claim 5 wherein the first code segment is included within the larger code segment during a development of the larger code segment, and wherein the reference date represents a testing date associated with a testing of the larger code segment for delivery of the larger code segment to a user.

8. The apparatus of claim 5 wherein the second code segment includes a fourth code segment for displaying, in conjunction with the halting of the operation of the larger code segment, a message regarding a presence of the first code segment.

9. The apparatus of claim 5 wherein the fourth code segment is further for searching the larger code segment for a character that is within the first code segment and that has been catalogued for searching.

10. A system comprising:

a storage medium for storing computer-readable code; and a processor for executing the computer-readable code, wherein the computer-readable code comprises:

means for designating a code portion for removal from code prior to a beginning of a pre-determined stage of completion of the code, wherein the means for designating the code portion includes marker code including an illegal programming statement;

means for determining whether the beginning of the pre-determined stage has occurred; and means for disabling the code upon a determination that the beginning of the pre-determined stage has passed without the removal of the code portion from the code, wherein the means for disabling the code includes a command within the marker code to terminate the code.

11. The system of claim 10 wherein the means for disabling the code comprises means for outputting a message regarding inclusion of the code portion within the code, in conjunction with the disabling of the code.

12. The system of claim 10 further comprising means for scanning the code for a plurality of instances of the code portion.

13. The system of claim 10 further comprising means for searching the code for a specific instance of the code portion.

* * * * *